Figure 1:
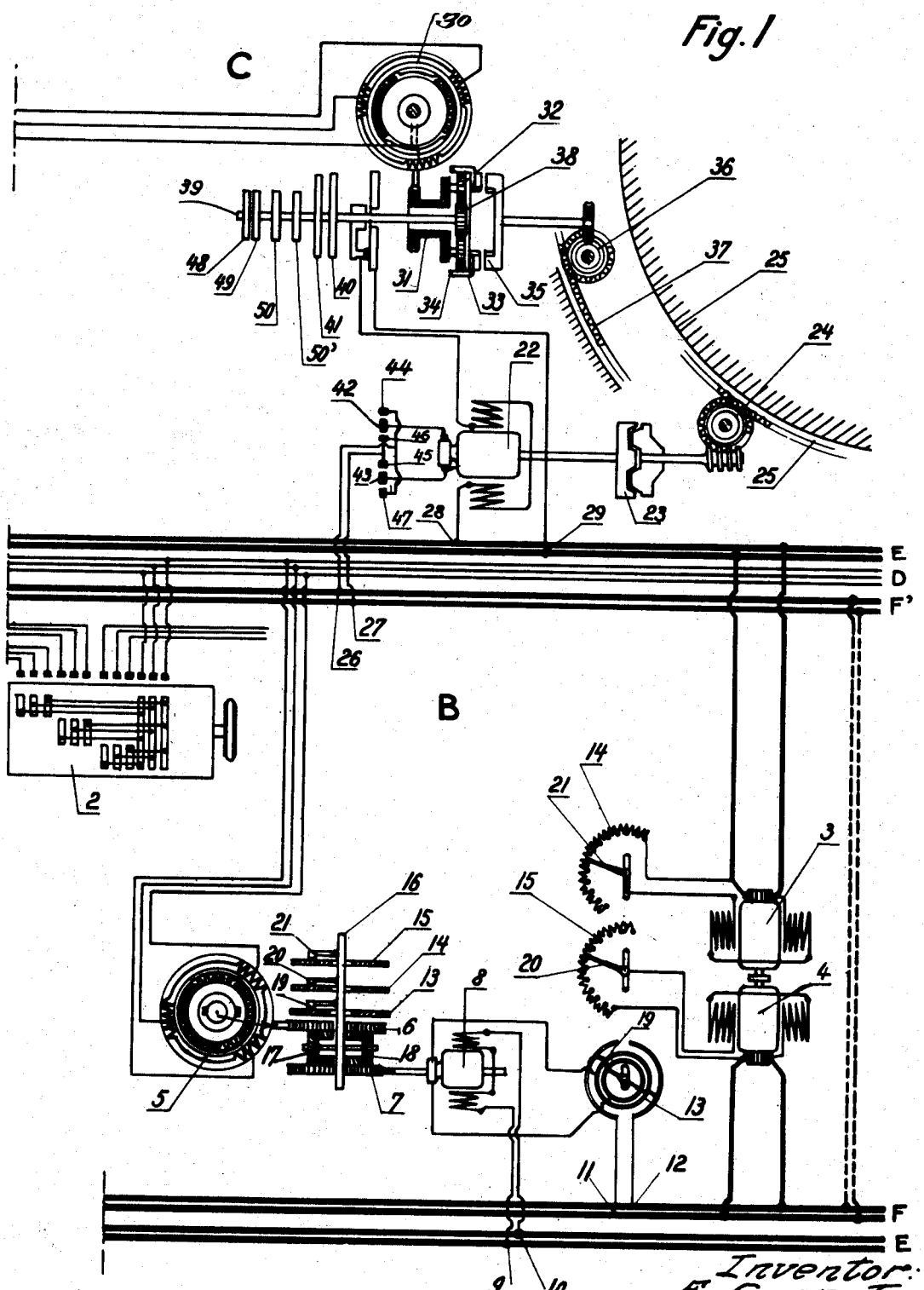

May 19, 1925.

E. GRANAT

ELECTRIC DISTANT CONTROL SYSTEM

Filed Jan. 29, 1923

7 Sheets-Sheet 1

Inventor:
E. Granat

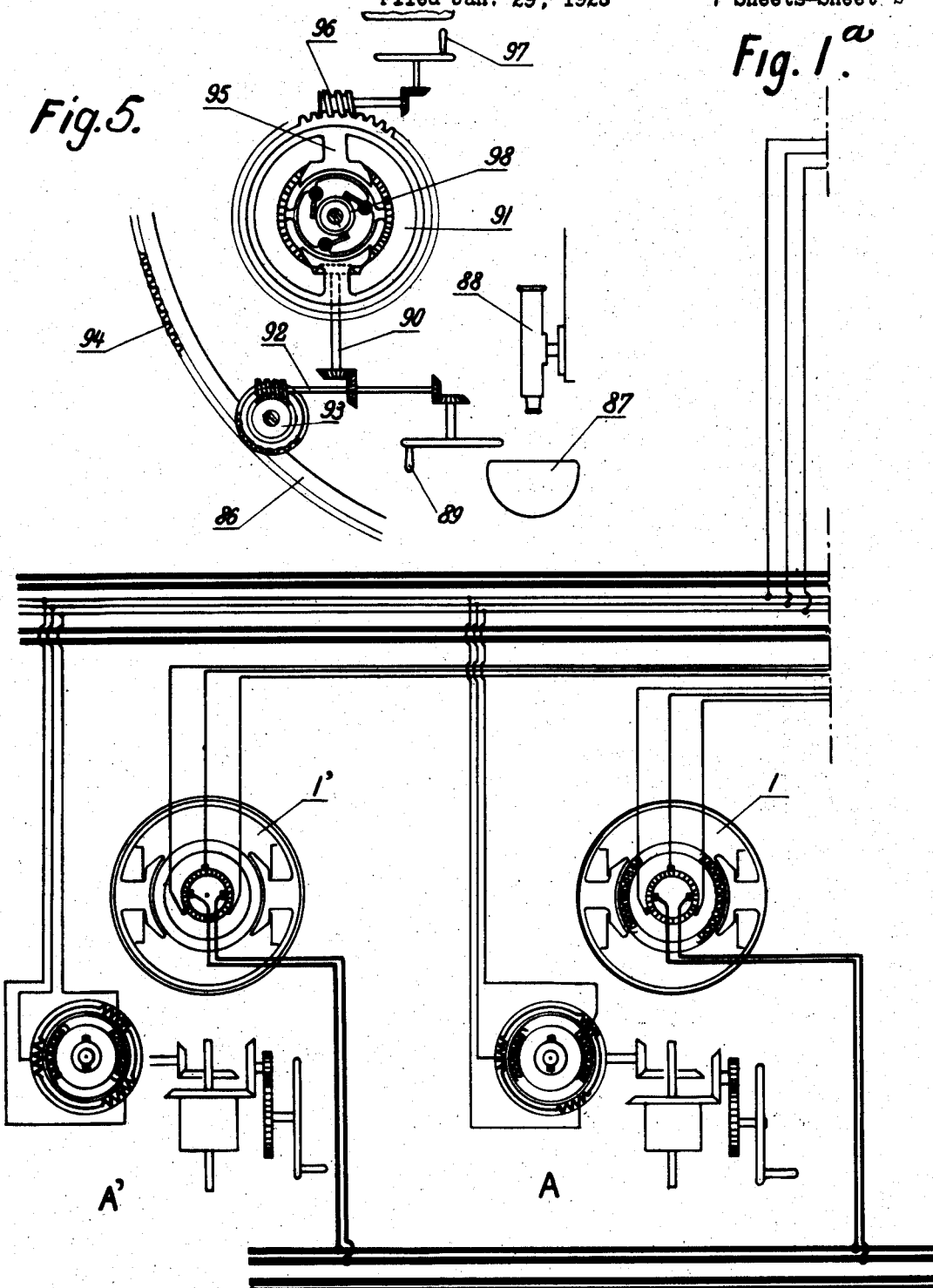

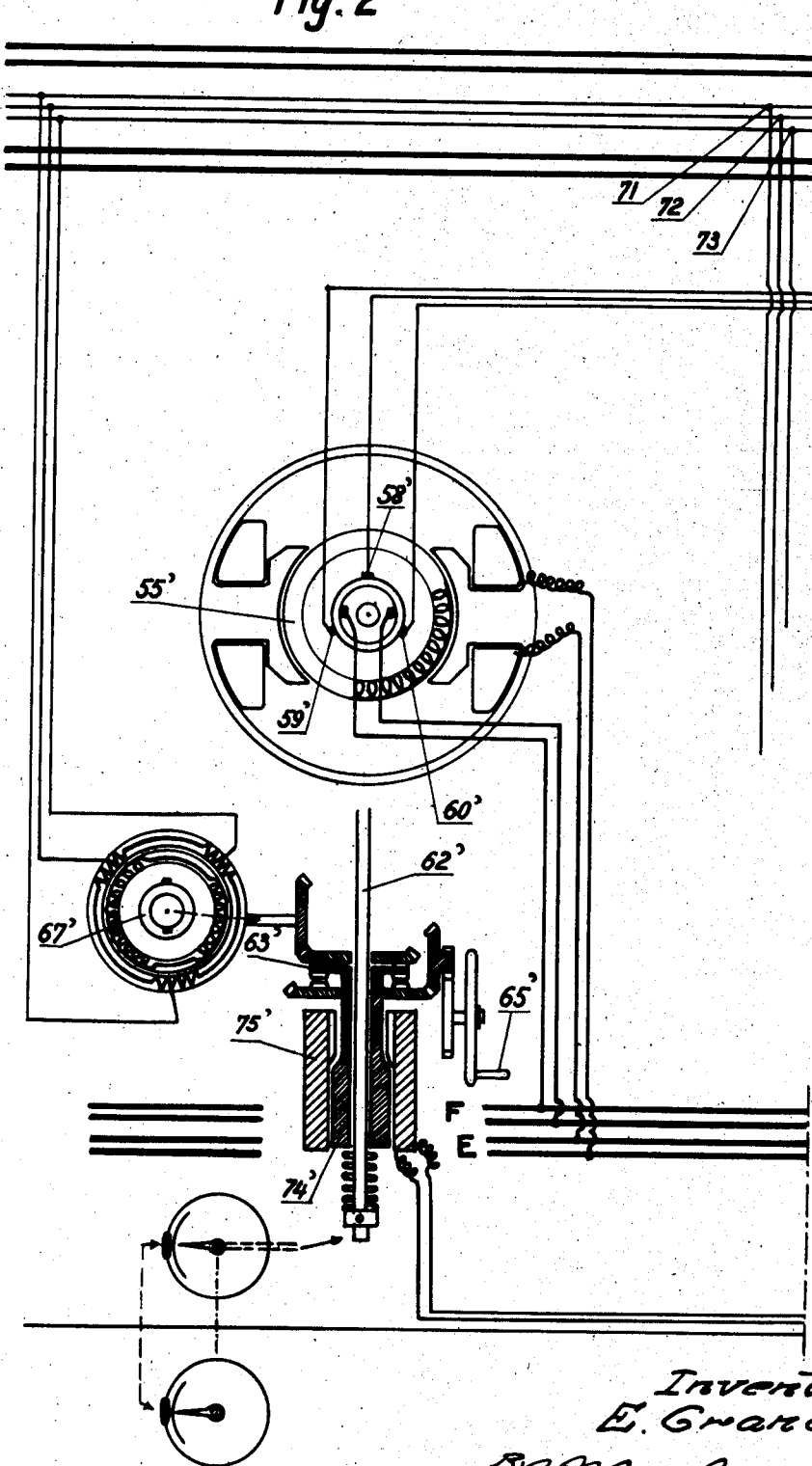

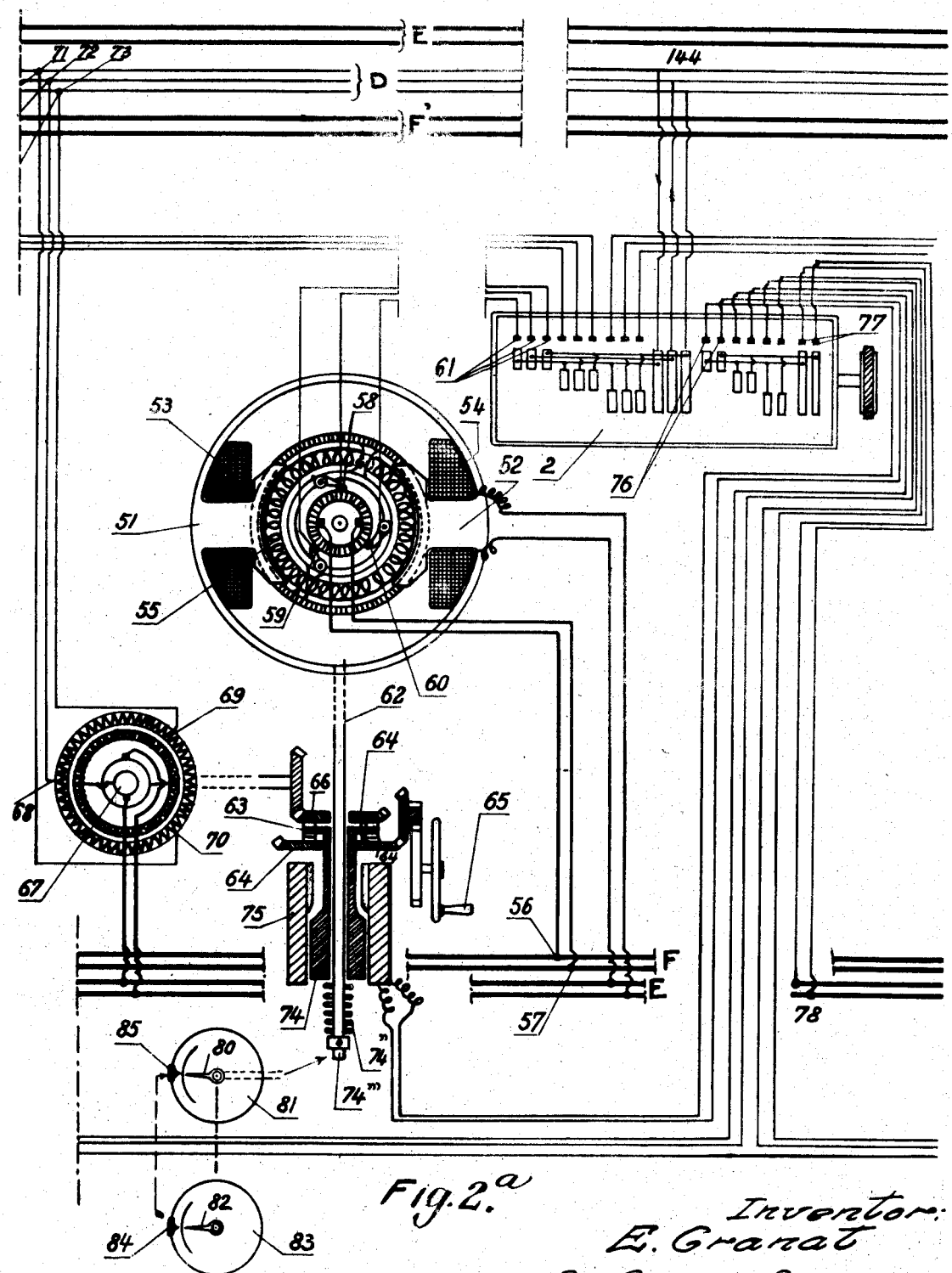
Fig.2.ª

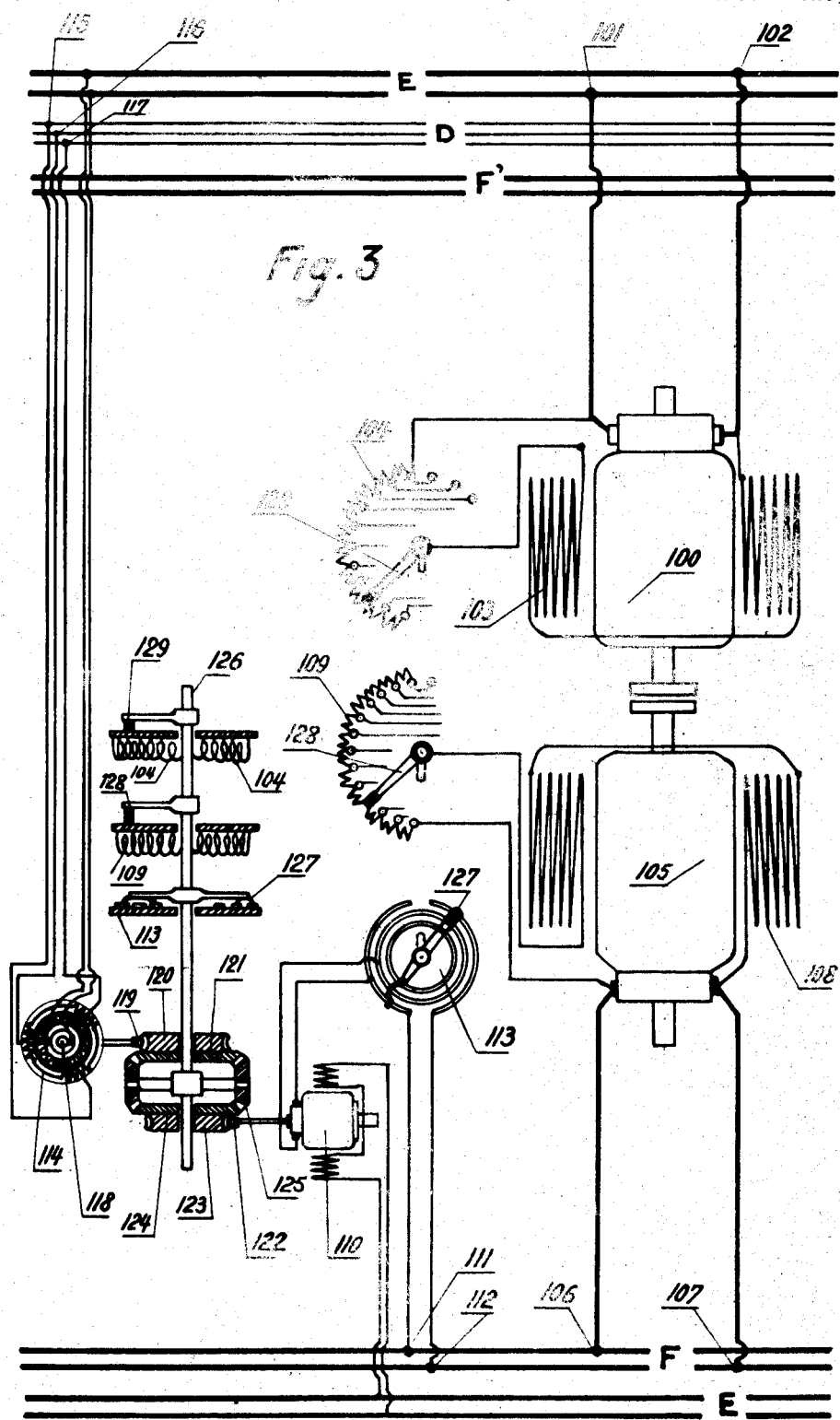

May 19, 1925.

E. GRANAT

ELECTRIC DISTANT CONTROL SYSTEM

Filed Jan. 29, 1923

1,538,546

7 Sheets-Sheet 6

Inventor:
E. Granat
by Marker Clark
Atty's

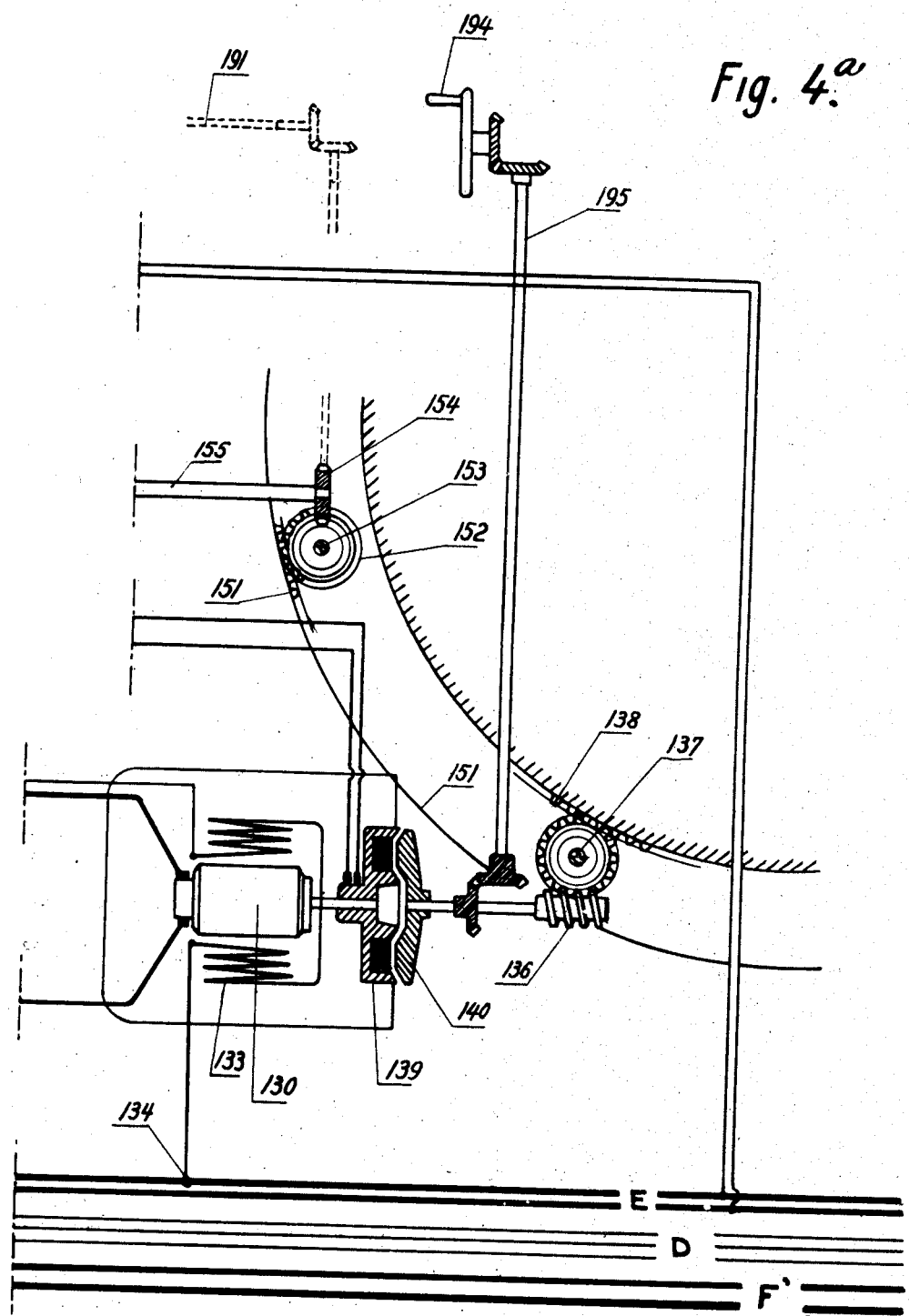

Patented May 19, 1925.

1,538,546

UNITED STATES PATENT OFFICE.

ELIE GRANAT, OF PARIS, FRANCE.

ELECTRIC DISTANT-CONTROL SYSTEM.

Application filed January 29, 1923. Serial No. 615,777.

*To all whom it may concern:*

Be it known that I, ELIE GRANAT, citizen of the French Republic, residing at 10 Rue Caumartin, Paris, France, have invented certain new and useful Electric Distant-Control Systems, of which the following is a specification.

My invention relates to an electric distant control system wherein a transmitting device which may have but a small power is moved in order to produce a like motion in a receiving device operating with great power, this being performed in such manner that the two devices will be in very close coincidence as to time and space, whereby each position of the said transmitter shall correspond to a single predetermined position of the receiver, the concordance of these two positions being exact both while operating and when the apparatus is stopped.

The principle of the invention may be stated as follows:

The transmitting station comprises the transmitter of a synchronized device for electric control termed "distant control transmitter," which is connected to a line known as "distant control circuit." To the said circuit is connected a controlled electric receiver which controls the voltage variations of a generator having a variable voltage; the said voltage will thus depend at each instant upon the operating speed of the transmitter. The said variable voltage generator supplies the motor which drives the receiving or actuated element: the said motor is separately excited and is supplied at a variable voltage, and it drives the actuated element at a speed which is substantially proportional to this voltage and will therefore depend practically upon the speed of the said transmitter. The operation of the switch for starting in the proper direction and stopping said motor, and of the excitation rheostat for the regulation of its speed, is carried on by means of a differential device which is actuated first by a synchronous controlled receiver connected to the said distant control circuit, and secondly by the movement of the receiving member.

The resulting motion of the differential device is transmitted to a shaft provided with cams adapted to operate suitable contacts so as to supply the motor actuating the said receiving device with current in the required direction as soon as there is any difference of position between the part of the differential operated by the motion of the receiver and the other part which is operated by the said controlled motor. The said shaft also controls the field rheostat of the motor so as to correct the speed of the receiver as controlled by the transmitter in order to obtain an exact control.

The following description, together with the accompanying drawings which are given by way of example, sets forth an embodiment of the said system of distant control which serves for the simultaneous aiming in direction of various cannon on shipboard by the simple operation of a hand wheel or of the telescopic sight of the central firing station.

Figs. 1 and 1ª constitute a diagrammatic general view of the installation.

Figs. 2, 2ª, 3, 4, 4ª and 5 are views shewing further details.

Figure 4:
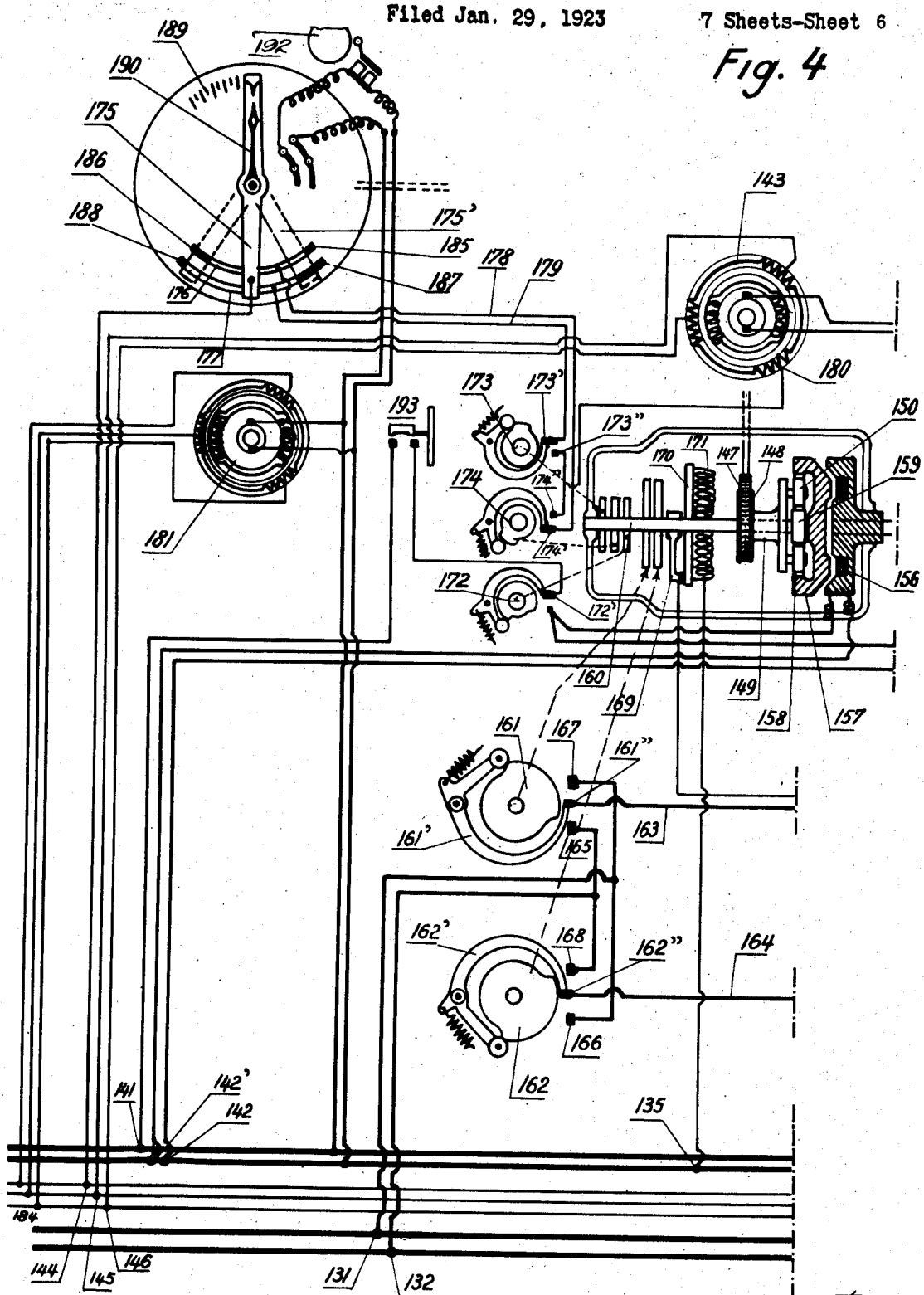

Figs. 2 and 2ª shew the transmitting stations. Fig. 3 shews the variable voltage generator. Figs. 4 and 4ª represent a receiving station. Fig. 5 shews a transmitting station which is operated by the telescopic sight.

The general installation comprises the following:

1—A main transmitting station A which is located at the central firing station, and various secondary transmitting stations A' etc., located for instance in the conning tower of the forward or rear bridge, or like point. Each station comprises an electric transmitter for distant control 1, 1'. The transmitter of the station in service supplies a distant control circuit D through the medium of a switching device 2.

2—A machine room B containing the electric motor 3 which drives a variable voltage generator 4; this group is controlled by a distant control receiver 5 mounted upon the said circuit D so that the voltage variations of the said generator shall follow the speed variations of the transmitter 1; the said generator supplies the variable voltage line F F'.

3—Receiving stations C, C' etc. (one for each cannon) each comprising a motor 22 mounted upon the circuit F' and actuating the operating elements of the corresponding cannon. The motor 22 is made to run in the proper direction, stopped, or corrected for speed according to the distant control system by means of a differential device 31—34 whereof the part 34 is connected with the cannon and the other part 31 is actuated by a controlled receiver 30 connected to the distant control circuit D.

The main transmitting station A comprises a distant control transmitter 1 which in the present example in constructed according to the type described in applicant's French Patent No. 540,353 of January 14th, 1921 entitled: Electric distant control system.

It will be remembered that the transmitter is therein constituted by a receiving electric machine having a fixed field, Fig. 2. and a movable armature whose commutator is supplied with continuous current by fixed brushes, and which is provided with a set of brushes 58, 59, 60 co-operating with the said commutator and revoluble about the same, the latter set of brushes being connected to the control circuit. Upon rotating the said set of movable brushes about the commutator, this will have the effect (as set forth in the said patent) of sending into the control circuit a polyphase current whose frequency varies with the speed of rotation of the set of brushes.

A corresponding receiver is employed which is equipped as an auto-synchronous motor; its stator is supplied by the said polyphase current of variable frequency which produces therein a rotating field having the same rate of rotation as the set of movable brushes of the transmitter; the rotor of the device has a closed circuit winding and is supplied with continuous current at two opposite fixed points on the closed winding, so that it will act as a magnet which follows the rotation of the field. The rotor will thus be very exactly controlled (as to time and space) by the set of movable brushes of the transmitter.

The transmitter 1 of the station A, Fig. 1, supplied a distant control circuit D having thereupon the various controlled receivers which will be further described; the supply is effected through a general switching device or permutator 2 so that any one of the transmitters 1. 1'. etc., is enabled to supply all the transmitting stations A, A' etc.

The machine room B comprises a constant voltage motor 3 supplied by the ship's circuit E and actuating a variable voltage generator 4 which supplies the variable voltage lines F, F'.

The control of the voltage of the generator 4 by the operating speed of the transmitter 1 is carried out in the following manner:

To the distant control circuit D is connected a controlled receiver 5 (for example of the type described in the above-mentioned patent) which drives one of the gear wheels 6 of a differential whereof the second gear wheel 7 is driven by a motor 8 whose armature receives current from the variable voltage line F at the points 11 and 12 through the reversing and switching device 13; the separately excited circuit of said motor is connected to the ship's circuit E at the points 9 and 10. A field rheostat 14 serves to regulate the speed of the motor 3, and a rheostat 15 regulates the excitation of the generator 4; by means of said rheostats the voltage of the generator 4 can be varied within wide limits and in a continuous manner. The fixed parts of the switching device 13 and of the rheostat 14 and 15 are disposed about the shaft 16 mounted upon the planetery gear set 17, 18, of the differential 6—7; said shaft carries the arms 19, 20, 21 used to operate the elements 13, 14, 15 respectively.

The said device operates as follows:

The controlled motor 5 connected to the distant control circuit D is exactly controlled (in time and space) by the motion of the transmitter 1. When the gear wheels 6 and 7 of said differential which are actuated respectively by the motor 5 and by the motor 8 which is supplied by the variable voltage circuit (whose speed at each instant will thus be proportional to the voltage of this circuit F), are caused to change their relative position for any reason, the planetary gear set 17, 18 will be made to rotate, and the arm 19 of the shaft 16 will operate the switch 13 so as to start the motor 8 in the proper direction and to stop the same as desired.

The speed of the motor 8 is proportional to the variable voltage of the line F supplying the same. The arms 20 and 21 of the shaft 16 will act respectively upon the rheostats 14 and 15 so as to increase the voltage of the generator 4 until the speed of rotation of the motor 8 shall be equal to that of the motor 5 whereby the variable voltage of the current produced by the generator 4, and supplying the lines F, F', shall depend exactly upon the speed of the transmitter 1.

A receiving station C is provided with the following elements: The main controlling motor 22 which drives (through the electromagnetic clutch 23) a pinion 24 co-operating with the traversing rack 25 for aiming the cannon in direction. The said motor is supplied by the variable voltage line F' by means of a circuit connected at the points 26, 27 and containing a reversing switch, and the field of the motor is supplied by the ship's circuit at the points 28, 29. When the said motor receives current it will rotate at a speed which is proportional to the variable (and controlled)) voltage of the line F' and hence at the same speed as the transmitter 1. In order to provide for the operation of said motor in either direction and for stopping the motor, according to the movements of the transmitter 1, the following arrangement is used:

A controlled receiver 30 is connected to the distant control circuit D and it rotates a sleeve 31 carrying the planetary gear set 32, 33 of a differential whose outer toothed ring 34 is actuated (through an electromagnetic clutch 35) by a pinion 36 which is driven by the rack teeth 37 of the gun platform. The central pinion 38 of said differential is keyed to a shaft 39 upon which are mounted the various elements for operating the motor 22 as to starting in the proper direction, stopping and control of the speed. The details of said elements will be further set forth, but the following is a summary description. The shaft 39 carries two cams 40, 41 of a reversing and switching device for operating the main controlling motor 22 in either direction by making contact between the switch studs 42, 43 (connected with the motor brushes) and studs 44, 45 or 46, 47 which are respectively connected to the lines 26, 27 of the variable voltage circuit F'. The shaft 39 has also mounted thereon the two cams 48, 49 for breaking the supply circuit of the motor 30 and therefore of the main motor 22 when the cannon attains the limits of lateral aiming in its field of fire. On the shaft 39 are also mounted two safety cams 50, 50' which act simultaneously to effect an additional breaking of the supply circuit of the clutches 23 and 35 so that if for any reason the supply of the main motor 22 should not have been cut off, the cannon would not be actuated.

The principal combinations of the system having been thus set forth, a detailed description will be given hereunder of an arrangement which is particular to this system.

In this arrangement, the transmitting station A is installed as follows:

The distant control transmitter, Fig. 2, is constituted by a field having two pole-pieces 51, 52 and the coils 53, 54 supplied by the ship's circuit E. The armature 55 of said transmitter comprises a continuous winding provided with a commutator cooperating with two brushes connected to the points 56 and 57 of the variable voltage circuit F. A set of three brushes 58, 59, 60 is movable about the said armature, the brushes being connected to the wires leading to the set of contact brushes 61 bearing upon the cylinder of the switch 2 or permutator, and the latter serves to connect the operative transmitter with the circuit D.

As set forth in the above-mentioned French patent, a transmitter of this type will send into the line connected to the three brushes 58, 59, 60 a three-phase current of variable frequency, which latter depends solely upon the speed of rotation of the three brushes. The set of brushes is controlled by a shaft 62 actuating a clutch disc 63 adapted to connect the shaft either with a gear wheel 64 actuated by an elevating hand wheel 65 or with a gear wheel 66 driven by a controlled receiver 67.

According to the above-mentioned patent, the said receiver consists of a stator comprising a continuous winding connected at three equidistant points 68, 69, 70 with the three supply wires for three-phase control which are connected to the distant control circuit D at 71, 72, 73.

The clutch disc 63 is secured to the core 74 of an electro-magnet 75, which is slidable on the shaft 62 but is revoluble with the same, said core being controlled by a winding 75. A spring 74" bearing upon a fixed support 74''' urges the disc 63 against the gear 66. The terminals of said winding are connected to the two brushes 76 of the general permutator 2, said brushes being connected to the pair of brushes 77 which are connected to the circuit E at 78, when the brushes 61 are connected to the distant control circuit D.

For a given position of the permutator 2, the circuit D is supplied by one of the distant control transmitters, for example the transmitter 1 of station A, the other transmitters being cut off from the circuit D. But these other transmitters have their armatures 53' always supplied by continuous current by the circuit F, and thus continue to rotate. Furthermore, all the motors 67' remain in constant connection with the circuit D so that their position as well as the position of the rotating brushes 58', 59', 60' which they control will constantly depend upon the position of the operative transmitter. One may therefore proceed at once to change over from the control by a station A to the control by another station A' etc. since the transmitter of the succeeding station is situated at each instant in the position corresponding to the aiming of the pieces. At this moment, when the electro-magnet 75' is energized, the permutator 2 being in suitable position, the clutch member 63' which rotates with the shaft 62' engages the lower pinion secured to the operating hand wheel 65' and is disengaged from the motor 67'. All the clutch discs of the stations other than the operative station A are in engagement with their controlled motor 67 etc.

In the arrangement shewn in Figs. 2 and 2ª, the shaft 62 of the set of movable brushes of the distant control transmitter is secured to the control pointer 80 of the dial 81 disposed at the station A, said pointer being connected to the pointer 82 of a like dial 83 mounted at the firing station and indicating the firing elements. The dial 83 has a second pointer 84 operated directly from this station and connected to the receiving pointer 85 mounted on the dial 81. The firing officer places the pointer 84 upon the proper scale division for the firing element which he is to transmit, and the pointer 85 reproduces this indication on the dial 81 in view of the gunner occupied with the hand wheel 65 of the distant control system and the latter will operate the wheel so as to hold the control pointer 80 in coincidence with the order pointer 85. At the firing officer's station, the repeating pointer 82 reproducing the motion of the control pointer 80 should coincide with the order pointer 84.

The shaft 62 may be actuated directly by the movement of the sight glass for aiming in direction, thereby eliminating the gunner at the wheel 65. An example of this case will be further set forth.

In order that the motion of the cannon may be entirely dependent in time and space upon the motion of the distant control hand wheel 65, the main motor 22 must be capable of operating the cannon at the same speed and with the same acceleration as are used for the said hand wheel.

But the speed and the acceleration which can be given to a cannon of a stated moment of inertia by a motor of a certain power are comprised within exact limits, and in order that the distant control device and the cannon should move in coincidence, the said control device should not receive a speed or acceleration which may be superior respectively to the speed and the acceleration which the motor of the power may communicate to the cannon.

To obtain this result, one of the two following devices can be used.

1—The speed and acceleration given by the gunner aiming the piece are limited in a positive manner by employing suitable resistance and inertia effects which are opposed to his action. Fig. 5 shews an arrangement of this kind wherein the apparatus at the control station is mounted upon a revoluble base 86 upon which are disposed the gunner's seat 87 and his sight glass 88 for aiming in direction. The hand wheel 89 for the distant control for aiming in direction actuates the shaft 90 driving the set of movable brushes of the distant control transmitter 91 and also a shaft 92 which (through the pinion 93) operates a rack 94 whereby the said base can be turned. The gunner's effort in operating his wheel 89 will depend upon the resistance and the inertia of the said revolving base, and these factors are so calculated that in normal operation the gunner shall not be able to exceed the limits of speed and acceleration corresponding to the maximum speed and acceleration which can be given to the cannon by the main motor 22. This gives the assurance that the cannon will remain under the control of the hand wheel 89 and that its driving motor 22 will not be called upon for an excessive effort.

2—The distant control station may comprise an outfit analogous to that of the cannon, so as to provide for the similarity of the movements (speed, acceleration) by using a suitable ratio between (a) the power of the motor controlling the motion of the station, (b) the moment of inertia, and (c) the mechanical resistances of the station.

This latter arrangement differs from the former only by the substitution of the electric motor for the force of the gunner.

In all cases in which the aiming in direction is to be corrected, the following means will be used (Fig. 5). If the correction is to be made as a lateral allowance, the field 95 of the distant control transformer 91 has at the exterior a toothed ring engaging a worm 96 actuated by the hand wheel 97 used for the lateral allowances: rotations of the said field will vary the direction of the field flux by a corresponding amount with respect to the instantaneous position of the set through a like angle, and it thus corresponds to a like angular correction of the controlled receivers.

If a correction for the parallax is to be added to the lateral allowance or correction the worm 96 is actuated by a differential which gives the algebraic sum of the allowance and the parallax. If different corrections are to be given to the various pieces of artillery, the distant control transmitter 91 will have as many field elements 95 and armature elements 98 placed in sequence on the same axis as there are cannon in use, and all the sets of revoluble brushes of all the armatures will be mounted on a common shaft actuated by the driving shaft 90; the various fields 95 are operated in an independent manner and will have a different angular spacing, so that the different cannon will receive the proper correction in each case.

The machine station, Fig. 3 is disposed as follows. A motor 100 with constant voltage and variable speed is connected at 101, 102 to the ship's circuit E. The exciting circuit 103 includes a field rheostat 104. The said motor is coupled to a variable voltage generator 105 supplying (at 106, 107) the variable voltage line F; the field circuit of said generator includes the rheostat 109. A motor 110 is supplied from the two points 111, 112 of the line F through a reversing and switching device 113. In order that the voltage variations in the circuit F of the generator 105 shall follow the speed variations of the aiming wheel 65 (Fig. 1) pertaining to distant control system, a controlled motor is disposed at 114 which is connected to the distant control line D at 115, 116, 117. The controlled motor 114 on the one hand (operating at the same speed as the distant control transmitter 65) and the motor 110 on the other hand (which being supplied by the variable voltage line F will rotate at a speed which is at all times proportional to the voltage) will act upon a differential whose resulting motion provides for the stopping and for the starting (in the desired sense) of the motor 110 by means of the switch 113, as well as for the regulating of the field rheostat 104 of the motor 100 and the rheostat 109 of the variable voltage generator 105. The said differential is constructed as follows. The rotor 118 of the controlled motor 114 actuates by the worm 119 a worm wheel 120 secured to the upper gear wheel 121 of the differential; in like manner the armature shaft of the motor 110 actuates by the worm 122 a worm wheel 123 secured to the lower gear wheel 124 of the differential whereof the planetary gear 125 are mounted on a shaft 126 upon which are disposed: (1) the arm 127 of the reversing and switching device 113, (2) the arm 128 of the field rheostat 109, (3) the arm 129 of the field rheostat 104. The operation of the said differential has been above described with reference to Fig. 1.

The receiving station C is disposed as follows, Figs. 4 and 4ª. The cannon platform is actuated by the main motor 130 which is supplied by the variable voltage line F' at the points 131—132. The field 133 of said motor 130 is connected to the ship's circuit E at 134, 135. The cannon is operated by the worm gear 136, 137 engaging the rack 138 of the cannon platform. Between the motor 130 and the worm 136 is mounted an electro-magnetic clutch 139, 140 supplied by the ship's circuit at the points 141, 142.

As above stated, the main controlling motor 130, which is supplied by the variable voltage line F' depending upon the operation of the hand wheel of the distant control device 65, will rotate at a speed depending substantially upon the operation of said hand wheel; any differences are corrected by a motor 143 which is under the exact control of the circuit D to which it is connected at the points 144, 145, 146. A differential is actuated on the one hand by the motor 143 and on the other hand by the motion of the cannon itself; the movement of the differential is used to control the motor 130 as to the stopping, the starting in either direction and the regulation and in this manner the said motor will be placed under a very exact control.

For this purpose, the rotor of the controlled motor 143 actuated by the worm 147 a worm-wheel 148 mounted upon a sleeve 149 carrying the two planetary gears 150; in like manner, a rack 151 upon the cannon platform actuates by means of a pinion 152 and the worm gearing 154, 153 a shaft 155 which (through a magnetic clutch 156, 157) carries the outer disc 158 of the planetary gear set. The central pinion 159 of the planetary gear set is mounted on the shaft 160 upon which are disposed the various elements for the control of the motor 130 for starting, stopping and field regulation.

The starting of the motor in either direction is obtained by means of two cams 161, 162 acting respectively upon a pivoted lever 161', 162' having at the end a contact piece (161" or 162") connected with the wires 163, 164 supplying the armature of the motor 130; the contact pieces 161", 162" can be brought simultaneously into contact with the set 165—166 or the set 167—168, which are connected to the line F' at 131, 132, so as to supply the armature of the motor 130 in either direction.

The field 133 of the motor 130 is regulated by means of an arm 169 mounted on the shaft 160 and co-operating with a stationary disc 170 provided with contact pieces connected with a resistance 171 mounted in the said field circuit of the main control motor 130. To the shaft 160 is also keyed the cam 172 employed at the end of the stroke; when the cannon has rotated through a certain angle in either direction, the said cam will break the supply circuits of the two magnetic clutches 139, 140 and 156, 157 which are respectively connected to the ship's circuit at 141, 142 and 142' whereby the cannon is connected on the one hand with the motor 130 and on the other with the differential.

The shaft 160 also carries two cams 173, 174 forming part of a device for limiting the field of fire; it serves to stop the motor 130 when the cannon attains the limits of the field such as are stipulated by the disposition of the cannon on board. The said device is constructed as follows:

The controlled motor 143 is supplied as stated by the distant control circuit D at 144, 145, 146. One phase for example 144 is connected to a lever 175 bridging two conducting sectors 176, 177; the wires 178, 179 are respectively connected to said sectors and to the movable contacts 173', 174' mounted upon the levers actuated by the cams 173, 174; the movable contacts 173', 174' co-operate respectively with the fixed contacts 173", 174" which are connected together by a wire 180 connected with the above-mentioned phase of the controlled motor 143. The arm 175 of the device for limiting the stroke is actuated by an auxiliary controlled motor 181 (used as a motor for aiming at a distance) which is connected to the distant control circuit D at 182, 183, 184. Each of the two conducting sectors 176, 177 is terminated by unequal insulating portions 185, 186 and 187, 188 respectively, which are disposed in contrary sense upon the two sectors; in this manner when the arm 175 reaches the end of its right or left hand stroke it is now in contact with only one of the two sectors, and this sector will be different for the right or the left hand position.

The operation of the said device for limiting the field of firing is as follows. When the cannon attains the limit of the firing field, for instance on the right hand side, the arm 175 reaches its right hand limiting position at 175' and is no longer in contact with the sector 177 but remains in contact with the sector 176. The motion of the cannon actuating the differential shaft 160 and the cam 174 will break the circuit at 174', 174'' which was the only one supplied through the sector 176; this will break the circuit of the phase 180 of the controlled motor 143, thus stopping the main operating motor 130.

When the hand wheel of the distant control device 65 is turned in the other direction, the arm 175 which has been in constant motion by means of its auxiliary motor 191 will now return to the left, and at a given moment it will make contact with the conducting part of the sector 177. From this time onward, since the contact at 173', 173'' of the cam 173 is closed, the third phase of the controlled motor 143 will begin to be supplied by the wire 179, and the motor 130 is again started. It should be observed that the cannon will automatically assume the proper position corresponding to the position of the hand wheel 65, without any angular difference.

The dial 189 of the arm 175 is also provided with a pointer 190 actuated by a shaft 191 which is driven by the shaft of the pinion 152, and said pointer will thus follow the motion of the cannon. As long as the arm 175 and pointer 190 are in coincidence, one may be sure that the complete control has been effected. In case of damage to the motor used for the electric distant control, the two pointers will become separated by a certain angle, and this will operate an electric bell 192, so that the gunner stationed at the cannon is notified that he should proceed with hand control as indicated by the pointer 175 actuated by the auxiliary controlled motor 181 which thus serves as a motor for aiming at a distance. He will cut off the current from the third phase of the controlled motor 143 by the switch 193 placed in the circuit 141—172'. Hand control is effected by the hand wheel 194 which actuates (through the intermediary of the shaft 195) the shaft of the worm gear 136, 137 which drives the rack 138. The gunner is required to maintain the pointer 190 and the arm 175 in coincidence.

What I claim is:

1. An electric distant control system comprising in combination, a transmitting station and at the transmitting station, an electric distant control transmitter; a generating station, at the generating station means for varying the voltage of the generating station, an electric motor fed by the generating station and a distant receiver controlled by the said transmitter and operating the said means for varying the voltage of the generating station; a receiving station, at the receiving station, a motor fed by the generating station; means for starting in either direction, stopping and regulating the speed of the said second motor; a distant receiver controlled by the transmitter and operating the said means.

2. An electric distant control system comprising in combination: a transmitting station and at the transmitting station, an electric distant control transmitter; a generating station; at the generating station, means for varying the voltage of the generating station; an electric motor fed by the generating station and a distant receiver controlled by the said transmitter controlling the speed of the said motor and operating the means for varying the voltage of the generating station; several receiving stations; at each receiving station a motor fed by the generating station; means for starting in either directions, stopping and regulating the speed of the said second motor; a distant receiver controlled by the transmitter and operating the said means.

3. An electric distant control system comprising in combination an electric distant control circuit; several transmitting stations; at each transmitting station an electric distant transmitter; feeding the electric distant circuit; an operating element for the transmitter an electric distant receiver fed by the distant control circuit; and a clutching device between the transmitter and the receiver and the operating element; a generating station; at the generating station means for varying the voltage of the generating station; an electric motor fed by the generating station and a distant receiver fed by the control circuit and operating the means for varying the voltage of the generating station; a receiving station; at the receiving station a motor fed by the generating station; means for starting in either directions, stopping and regulating the speed of the said second motor; a distant receiver fed by the electric distant circuit and operating the said means.

4. An electric distant control system comprising an electric distant control circuit; several transmitting stations; at each transmitting station, an electric distant transmitter feeding the distant control circuit; an operating element for the transmitter; an electric distant receiver fed by the said control circuit; and a clutching device between the said transmitter and the receiver and the operating element; a generating station; at the generating station means for varying the voltage of the generating station; an electric motor fed by the generating station and a distant receiver controlled by the said control circuit operating the means for varying the voltage of the generating station; several receiving stations; at each receiving station a motor fed by the generating station; means for starting in either direction, stopping and controlling the said motor, a receiver fed by the electric control circuit and operating the said means.

5. In a distant electric control system an electric distant control circuit; several transmitting stations; at each transmitting station a transmitter feeding the electric distant control circuit; an operating element for the transmitter; an electric distant receiver fed by the said circuit; and a clutching device between the transmitter and the receiver and the operating element; a generating station; at the generating station means for varying the voltage of the generating station; an electric motor fed by the generating station and a distant receiver controlled by the said control circuit and operating the means for varying the voltage of the generating station; a receiving station; at the receiving station a motor fed by the generating station; means for starting in either direction, stopping and regulating the speed of the said second motor; a distant receiver fed by the electric control circuit and operating said means; a permutation switch connecting electrically to the distant control circuit the transmitter of any one of the transmitting stations, and actuating the clutching device of the transmitting station.

6. In a distant electric control system an electric distant control circuit; several transmitting stations; at each transmitting station a transmitter feeding the electric distant control circuit; an operating element for the transmitter; an electric distant receiver fed by the said control circuit, and a clutching device between the transmitter and the receiver and the operating element; a generating station; at the generating station means for varying the voltage of the generating station; an electric motor fed by the generating station and a distant receiver controlled by the said control circuit and operating the means for varying the voltage of the generating station; several receiving stations, at each receiving station a motor fed by the generating station; means for starting in either directions, stopping and regulating the speed of the said second motor; a distant receiver fed by the electric control circuit and operating the said means; a permutation switch connecting electrically to the distant control circuit the transmitter of any one of the transmitting stations; and actuating the clutching device of the transmitting station.

7. In a distant electric control system an electric polyphase distant control circuit, several transmitting stations; at each transmitting station a motor provided with a collector; movable brushes on the collector connected to the control circuit; the whole constituting a transmitter; operating element for the revoluble brushes; an electro-synchronous motor fed by the said circuit and constituting the distant receiver; and a clutching device between the transmitter and the receiver and the operating element, a generating station; at the generating station a motor fed by the generating station; an anti-synchronous motor fed by the controlling circuit and operating the means for varying the voltage of the generating station; several receiving stations, at each receiving station, a motor fed by the said generating station; means for starting in either directions, stopping and regulating the speed of the said second motor; an auto-synchronous motor fed by the control circuit, constituting the receiver and operating the said means.

8. In an electric distant control system, a distant control circuit; a transmitting station; at the transmitting station an electric distant transmitter feeding the control circuit; a generating station; at the generating station a motor generator group; a field rheostat for the motor of the group; an excitation rheostat for the generator of the group; a distant receiver fed by the distant control circuit; a motor fed by the generator; a switch for the starting in either direction and the stopping of the said second motor actuated by a differential actuated by the second motor and the receiver and actuating the said switch, the said field rheostat and the said excitation rheostat; a receiving station; at the receiving station a motor fed by the generating station; means for starting in either directions, stopping and regulating the speed of the said second motor; a distant receiver fed by the electric control circuit and operating the said means.

9. In an electric distant control system a distant control circuit; a transmitting station; at the transmitting station an electric distant transmitter feeding the said control circuit; a generating station; means for varying the voltage of the generating station; an electric motor fed by the generating station and a distant receiver controlled by the control circuit and operating the said means for varying the voltage of the generating station; a receiving station; at the receiving station a motor fed by the generating station; a field rheostat for the said motor; a switch for starting in either direction the said motor; a receiver fed by the control circuit; a differential actuated by the motor and the receiver and operating the field rheostat of the motor, and the said switch.

In witness whereof I have hereunto set my hand.

ELIE GRANAT.